Patented Jan. 17, 1939

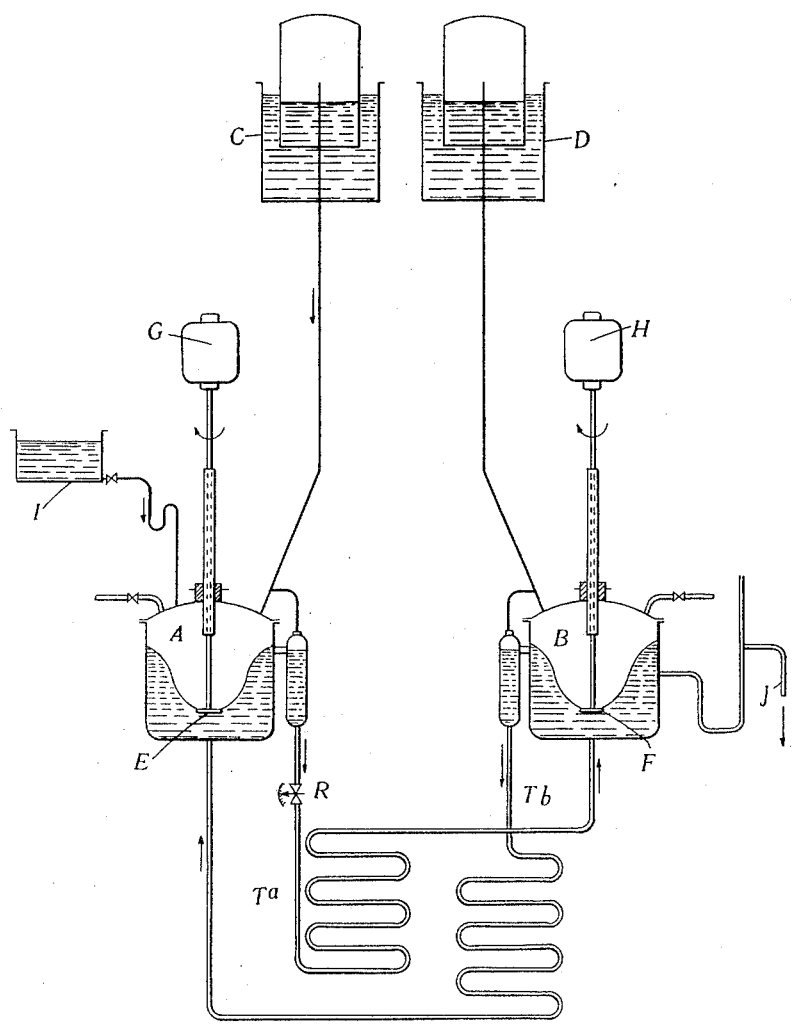

2,144,053

UNITED STATES PATENT OFFICE 2,144,053

APPARATUS FOR REACTING GASES WITH LIQUIDS

Henri Martin Guinot, Niort, Deux-Sevres, France, assignor to Usines De Melle, Melle, Deux-Sevres, France, a corporation of France Original application February 26, 1936, Serial No. 65,915. Divided and this application October 15, 1937, Serial No. 169,314. In France March 6, 1935

6 Claims. (Cl. 261—83)

This application is a division of my application Serial No. 65,915 filed February 26th 1936.

The invention relates to apparatus for reacting gases with liquids, and is particularly suited to the manufacture of chlorhydrins. It is well known to produce chlorhydrins by the action of olefine hydrocarbons on aqueous solutions of hypochlorous acid, the latter being generally obtained by the hydrolysis of chlorine dissolved in water, after which the resultant hypochlorous acid is reacted with the olefine.

In carrying out the dissolving of the chlorine in water and the reacting of the acid with the olefine it is necessary to employ an apparatus which is capable of resisting the very corrosive solutions to be treated. In known processes it is practically impossible to avoid the formation with the chlorhydrin of a certain amount of undesirable products such as ethylene chloride resulting from the direct action of free chlorine on ethylene.

The invention has among its objects to avoid the disadvantages hereinbefore mentioned and to provide an apparatus which is simple in construction and effective in operation.

The invention has further among its objects to provide apparatus in which direct contact of the interacting gases is avoided in the free state even in solution and for the purpose to ensure that the proportion of chlorine dissolved in unit volume of the liquid is extremely small, thus avoiding the formation of undesired products, such as ethylene dichloride.

According to the invention the apparatus comprises two or more vessels which are interconnected by piping so as to permit of intercirculation of liquid from one vessel to another and means provided in each vessel for effecting an emulsification of the gas and liquid in the vessel, the said means being also effective to cause a flow of liquid to and from said vessel.

In its particular application to the manufacture of chlorhydrins by the interaction of olefines with aqueous solutions of chlorine the apparatus according to the invention comprises two reacting vessels which are interconnected by piping in such manner as to permit of circulation of liquid between the vessels, the outlet from each vessel being disposed advantageously at a position near the top of the vessel and the inlet at a position near the bottom. The gases, namely chlorine and an olefine, to be emulsified with the liquid, are fed to the respective vessels from gasometers and water is fed to the chlorine reacting vessel from a reservoir. The vessels are provided with means for effecting a stirring of the liquid and such means may advantageously take the form of centrifuges which are operated from electric motors mounted outside the vessels. The centrifuges in operation create a vortex in the liquid which gives rise to a suction downwardly of the gas into the hollow cone of the vortex, thus effecting a forced emulsification of the gas with the liquid. The vortex is also effective to cause a circulation of liquid between the vessels, a suction being induced at the lower part of the vessel at the inlet, and a pressure to force the liquid outwardly near the top.

The circulation of the liquid is so regulated as to ensure the optimum conditions for the formation of chlorhydrin without the formation of undesirable products such as ethylene dichloride.

The chlorhydrin solution may be drawn off continuously for purification and dehydration from the olefine reacting vessel.

The accompanying drawing represents diagrammatically, in one of its embodiments, the apparatus for the manufacture of aqueous solutions of chlorhydrins.

The apparatus comprises essentially two vessels A and B which communicate with a chlorine gasometer C and an olefine gasometer D respectively and which are connected together by pipes Ta and Tb that enable the liquid to circulate between the two vessels. These two vessels, constituting two separate operating regions, are preferably made of stoneware and are each provided with a centrifuge that rotates at a speed that is sufficient for the production, in the liquid, of a vortex with a suction cone which leaves the top face of the centrifuge uncovered. The centrifuges are denoted by E and F respectively and their driving motors by G and H respectively. In this way, the gas which constitutes the atmosphere of the vessel is sucked into the hollow cone of the vortex and forcibly emulsified in the liquid. On the other hand, the reduction of pressure produced in the liquid in the neighbourhood of the centrifuge in one vessel enables the liquid contained in the other vessel to be drawn by suction through the pipes Ta and Tb. Each pipe is connected to one vessel at a position high up where the liquid rises by centrifugal action and to the other vessel at a lower level. As these pipes are assumed normally to be charged with water, the regulation of the opening of the cock R, mounted in one of the pipes, ensures the desired rate of circulation between the two vessels being maintained.

It is to be noted that the pipes Ta and Tb are so disposed and of such length as to offer a large surface of heat exchange, thus ensuring an intense cooling of the liquids in circulation, this being beneficial because the reaction under consideration is accompanied by an evolution of heat.

In order to start the apparatus, one of the vessels is connected with the chlorine gasometer C and the other with the gasometer D that is charged with the olefine to be treated. The centrifuges are caused to rotate and the opening of the cock R is regulated with a view to obtaining the optimum speed of circulation between the vessels A and B; particularly to ensure that the proportion of chlorine dissolved in unit volume of the circulating liquid is so small that all the dissolved chlorine is hydrolized to hypochlorous acid, and intense absorption of the two gases and the mixing of the liquid follows with the formation of chlorhydrin. As the gaseous chlorine reaches a state of perfect solution only in the vessel in which the olefine is absorbed, the production of the dichloride is very small. The vessels A and B do not require to be hermetically sealed; in particular, the shaft of the centrifuge does not have to be provided with a stuffing box but only with a greased guide, because the static pressure which exists in the vessel can be regulated so as to be as little different as possible from the atmospheric pressure.

The production of chlorhydrin can be made continuous by adding water continuously preferably into the chlorine vessel and producing its removal by overflowing from the other vessel. The water tank is denoted by I in the drawing, and the overflow for removing the solution of chlorhydrin is denoted by J.

Under these conditions, the yields of chlorhydrin in relation to the products treated are excellent—i. e., of the order of 90 to 95 per cent.—if care is taken not to allow the temperature to rise above 15° to 20° C. However, the production of a small quantity of dichloride, which is found in solution along with the chlorhydrin, cannot be avoided, and the elimination of the dichloride and the separation of the chlorhydrin in the pure state may be effected, in extraction batteries of known type which, for the sake of simplicity, have not been represented in the figure.

Example 1

*Manufacture of the chlorhydrin of ethylene glycol*

The stoneware vessels A and B each have a capacity of about 200 litres. The centrifuges, made of glass or special steel which is unattackable by the hydrochloric solutions treated, revolve at a speed which is sufficient to ensure a rate of about 10 cubic metres per hour for the liquid circulating between A and B. Under these conditions, 5 cubic metres of chlorine and ethylene per hour are absorbed in the two vessels respectively. It is even possible to double this speed of absorption if the increase of production of ethylene chloride which results therefrom is not considered to be undesirable.

In normal working, the vessel A is charged with 200 litres of water per hour, so that there overflows into B a solution containing about 1 gramme-molecule of chlorhydrin per litre.

The solution in vessel B is acid; it is exactly neutralized by milk of lime.

After filtration, the liquid is treated continuously in an extraction battery of known type (see French Patent No. 671,482) with a view to its purification by a suitable solvent, the purified chlorhydrin solution being then extracted and dehydrated in known manner.

The pure chlorhydrin (B. P. 128 to 129° C.) is finally obtained with an excellent yield (92 per cent.), without taking into account the ethylene chloride (B. P. 83 to 84° C.) separated.

Example 2

*Manufacture of the chlorhydrin of propylene glycol*

A normal aqueous solution of the chlorhydrin of propylene glycol is produced by working in the manner explained in the preceding example, with the sole difference that the gasometer which communicates with the vessel F contains propylene instead of ethylene.

After exact neutralization by means of caustic soda, the resultant chlorhydrin solution is purified and dehydrated by known means. The chlorhydrin of propylene glycol (B. P. 125 to 127° C.) is obtained in the pure state with a yield of 90 per cent. calculated on the chlorine and propylene used.

These examples are not limitative and it is also pointed out that, without departing from the scope of the present invention, all these operations can be carried out under a pressure that differs from the ordinary pressure, either with a view to obtaining certain recoveries of heat during the distillation for example, or for the purpose of increasing the velocity of reaction during the first stage of the preparation of the aqueous solutions of chlorhydrin.

The apparatus described may be utilized in a number of reactions involving the reaction of liquids and gases, for example in the manufacture of ethanol-amine by the action of ethylene oxide on aqueous solutions of ammonia.

What I claim is:—

1. Apparatus for reacting gases with liquids comprising two mixing vessels, interconnecting means between said vessels to permit of circulation of liquid between said vessels, means for supplying gas to each mixing vessel, means for supplying liquid to at least one of said mixing vessels, and centrifugal stirring means in each of said mixing vessels for aspiring the gas into the liquid and dispersing it therein and for producing a pressure differential in each vessel to induce circulation of the resultant emulsified liquid between said vessels through said interconnecting means.

2. Apparatus for reacting gases with liquids comprising two mixing vessels, interconnecting means between said vessels to permit of circulation of liquid between said vessels, means for supplying gas to each mixing vessel, means for supplying liquid to at least one of said mixing vessels, and centrifugal stirring means in each of said mixing vessels for aspiring the gas into the liquid and dispersing it therein and for producing a pressure differential in each vessel to induce circulation of the resultant emulsified liquid between said vessels through said interconnecting means, said interconnecting means being of a length and so disposed as to facilitate cooling of the emulsified liquid flowing between said vessels.

3. Apparatus for reacting gases with liquids comprising two mixing vessels, interconnecting means consisting of piping leading respectively from a position near the top of one vessel to a position near the bottom of the other vessel and vice versa to permit circulation of liquid between said vessels, means for supplying gas to each mixing vessel, means for supplying liquid to at least one of said vessels, and centrifugal stirring means in each of said mixing vessels for aspiring the gas into the liquid and dispersing it therein and for producing a pressure differential in each vessel to induce circulation of the resultant emulsified liquid between said vessels through said interconnecting means.

4. Apparatus for reacting gases with liquids comprising two mixing vessels, interconnecting means between said vessels to permit of circulation of liquid between said vessels, means for supplying gas to each mixing vessel, means for supplying liquid to at least one of said mixing vessels, centrifugal stirring means in each of said mixing vessels for aspiring the gas into the liquid and dispersing it therein and for producing a pressure differential in each vessel to induce circulation of the resultant emulsified liquid between said vessels through said interconnecting means, and means for regulating the flow of liquid between said vessels.

5. Apparatus for the production of chlorhydrins by the action of olefines on an aqueous solution of chlorine comprising a chlorine gasometer, an olefine gasometer, a water reservoir, a mixing vessel, means for supplying water and chlorine to said mixing vessel from said water reservoir and chlorine gasometer respectively, a second mixing vessel, means for supplying olefine to said second vessel from said olefine gasometer, piping interconnecting the two vessels to permit circulation of liquid therebetween, and a centrifugal stirrer in each of said mixing vessels for aspiring the gas therein into the liquid therein and for dispersing said gas in said liquid, said centrifugal stirrers producing a pressure differential in each vessel to induce circulation of the resultant emulsified liquid between said vessels through said piping.

6. Apparatus for the production of chlorhydrins by the action of olefines on an aqueous solution of chlorine comprising a chlorine gasometer, an olefine gasometer, a water reservoir, a mixing vessel, means for supplying water and chlorine to said mixing vessel from said water reservoir and gasometer reservoir respectively, a second mixing vessel, means for supplying olefine to said second vessel from said olefine gasometer, piping interconnecting the two vessels to permit circulation of liquid therebetween, a centrifugal stirrer in each of said mixing vessels for aspiring the gas therein into the liquid therein and for dispersing said gas in said liquid, said centrifugal stirrers producing a pressure differential in each vessel to induce circulation of the resultant emulsified liquid between said vessels through said piping, valve means in said piping for regulating the flow of liquid between the two vessels, and an outlet for liquid from the vessel to which the olefine is supplied.

HENRI MARTIN GUINOT.